US 6,548,990 B2

(12) United States Patent
Okuno et al.

(10) Patent No.: US 6,548,990 B2
(45) Date of Patent: Apr. 15, 2003

(54) AUTOMATIC VEHICLE-MOUNTED DEVICE CONTROL SYSTEM

(75) Inventors: Tomoya Okuno, Nishio (JP); Koji Tanaka, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/948,581

(22) Filed: Sep. 10, 2001

(65) Prior Publication Data

US 2002/0036485 A1 Mar. 28, 2002

(30) Foreign Application Priority Data

Sep. 28, 2000 (JP) ........................................ 2000-296345
Nov. 24, 2000 (JP) ........................................ 2000-357684

(51) Int. Cl.⁷ ............................ H02H 7/06; H02P 11/00; H02P 9/00
(52) U.S. Cl. ............................. 322/36; 322/22; 322/23; 322/24; 322/17
(58) Field of Search ........................... 322/36, 22–24, 322/17

(56) References Cited

U.S. PATENT DOCUMENTS

| 4,543,521 | A | * | 9/1985 | Morishita et al. ............. 320/64 |
| 4,556,943 | A | * | 12/1985 | Pauwels et al. ........... 364/431.12 |
| 4,598,373 | A | * | 7/1986 | Morishita et al. ............. 364/424 |
| 4,608,639 | A | * | 8/1986 | Morishita et al. ........... 364/424 |
| 4,730,256 | A | * | 3/1988 | Niimi et al. ............. 364/431.12 |
| 5,200,900 | A | * | 4/1993 | Adrain et al. .......... 364/431.12 |
| 5,256,959 | A | * | 10/1993 | Nagano et al. ................ 322/25 |
| 5,352,971 | A | * | 10/1994 | Nishimura ................... 322/27 |
| 5,467,008 | A | * | 11/1995 | Uchinami .................... 322/27 |
| 5,481,176 | A | * | 1/1996 | DeBiasi et al. ................ 322/7 |
| 5,523,672 | A | * | 6/1996 | Schramm et al. .............. 322/25 |
| 5,670,845 | A | * | 9/1997 | Grant et al. ................... 315/77 |
| 6,013,135 | A |   | 2/2000 | Banyas et al. .............. 320/112 |
| 6,208,931 | B1 | * | 3/2001 | Schoettle et al. ........... 701/115 |
| 6,429,613 | B2 | * | 8/2002 | Yanase et al. .............. 318/139 |
| 6,442,455 | B1 | * | 8/2002 | Kotre et al. ................... 701/22 |
| 6,469,476 | B1 | * | 10/2002 | Barrett et al. ................. 322/29 |
| 6,486,638 | B1 | * | 11/2002 | Sumimoto et al. ............ 322/28 |
| 6,486,639 | B1 | * | 11/2002 | Montret et al. ............... 322/29 |

FOREIGN PATENT DOCUMENTS

| EP | 0 327 027 | 8/1989 |
| EP | 0 661 791 A2 | 7/1995 |
| EP | 0 725 473 A2 | 8/1996 |
| EP | 0 740 396 A2 | 10/1996 |
| EP | 0 720 271 A1 | 12/1996 |
| EP | 0 783 994 A1 | 7/1997 |
| WO | WO 01/28084 A1 | 4/2001 |

* cited by examiner

Primary Examiner—Nestor Ramirez
Assistant Examiner—Pedro J. Cuevas
(74) Attorney, Agent, or Firm—Oliff & Berridge, PLC

(57) ABSTRACT

A voltage regulator of a power generator device and an electronic control unit are connected through a communication line. The voltage regulator transmits power generator type identification information for specifying a type of the power generator device to the electronic control unit. The electronic control unit stores a plurality of control modes and selects one of the plurality of control modes based on the received power generator type identification information. The electronic control unit outputs a control signal to the regulator so that the voltage regulator regulates power generating operation of the power generator device in response to the control signal.

9 Claims, 4 Drawing Sheets

US 6,548,990 B2

AUTOMATIC VEHICLE-MOUNTED DEVICE CONTROL SYSTEM

CROSS REFERENCE TO RELATED APPLICATION

This application is based on and incorporates herein by reference Japanese Patent Applications No. 2000-296345 filed Sep. 28, 2000 and No. 2000-357684 filed Nov. 24, 2000.

BACKGROUND OF THE INVENTION

The present invention relates to a vehicle-mounted device control system mounted in a passenger vehicle, a truck or the like, and particularly to a power generator control system which enables use of a single electronic control unit even when a power generator type is changed.

Electric power generated by a power generator (alternator) mounted in a vehicle is used to drive various electric loads and to charge a vehicle-mounted battery. The output current characteristic and the torque characteristic of the power generator are determined in accordance with a vehicle type and vehicle-mounted electric loads. These characteristics differ by types of vehicles. Further, the characteristics differ for the same type of vehicle, when a maker of a power generator differs.

When the output current characteristic and the torque characteristic of a power generator differ, it is necessary to change control constants of an electronic control unit for controlling other vehicle-mounted devices in accordance with operation characteristics of a power generator. As a result, it is necessary to provide various types of electronic control units in vehicles in correspondence with the types of power generators.

SUMMARY OF THE INVENTION

It is therefore an object of the present invention to provide a vehicle-mounted device control system capable of reducing the number of necessary types of electronic control units and power generators.

According to the present invention, a vehicle-mounted control system comprises a vehicle-mounted device such as a power generator controllable in response to a control signal applied thereto, an electronic control unit for controlling the vehicle-mounted device by outputting the control signal, and a communicating line for transmitting the control signal from the electronic control unit to the vehicle-mounted device. The electronic control unit automatically changes the control signal in response to a change in a type of the vehicle-mounted device.

BRIEF DESCRIPTION OF THE DRAWINGS

The above and other objects, features and advantages of the present invention will become more apparent from the following detailed description made with reference to the drawings.

DETAILED DESCRIPTION OF THE EMBODIMENT

[First Embodiment]

Figure 1:
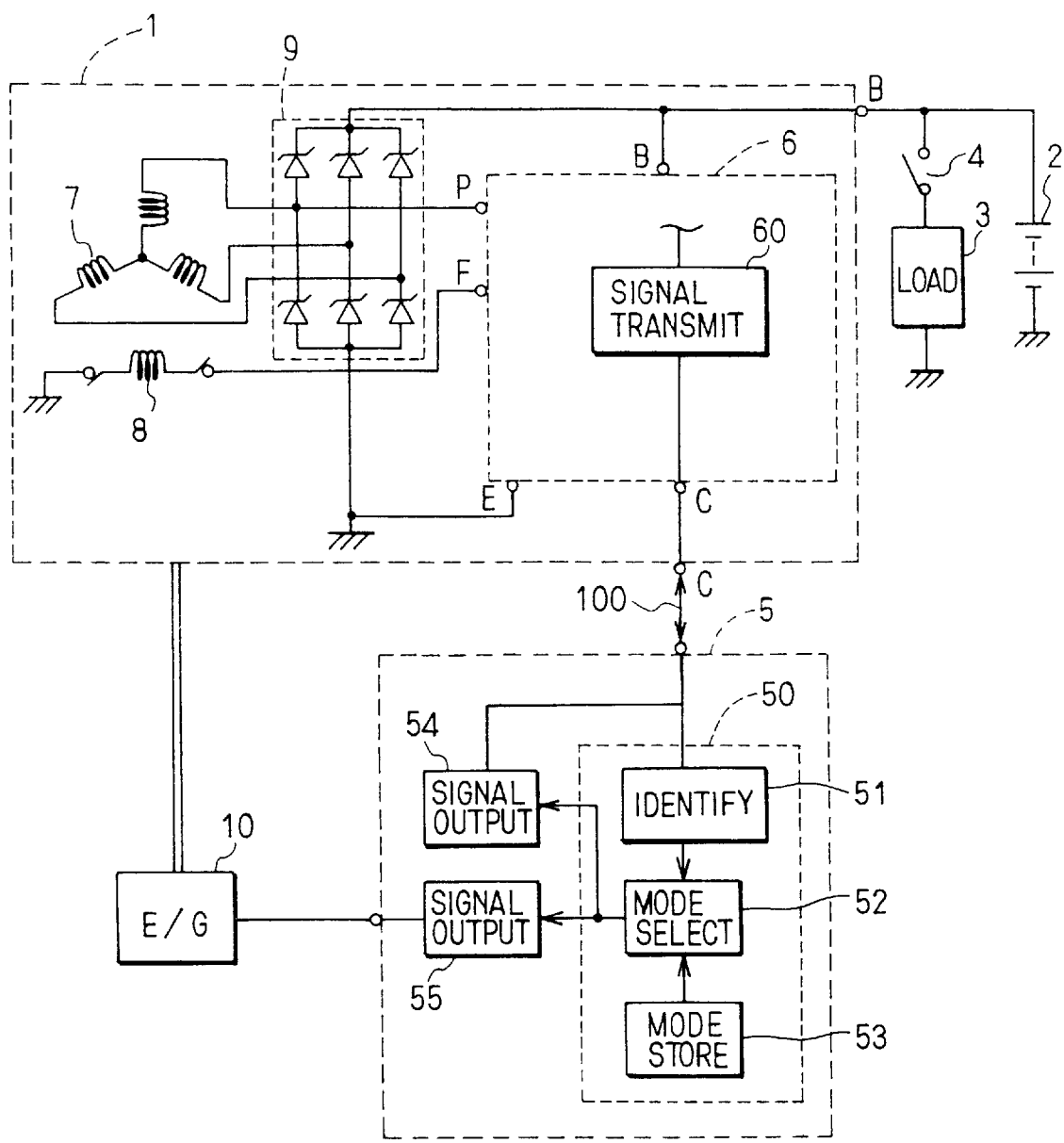
FIG. 1 is a block diagram of a vehicle-mounted power generator control system according to a first embodiment of the invention.

Referring to FIG. 1, a vehicular power generator device 1 comprises an alternator mounted in a vehicle. A field winding 8 of the power generator device 1 is wound about a rotor (not illustrated), and is rotated in synchronism with rotation of an engine (E/G) 10 to thereby generate a rotating field. Armature windings 7 wound around a stator core (not illustrated) opposed to the rotor with a gap generate alternating current power in accordance with a magnitude of the rotating field provided by the field winding 8. The power generator device 1 and the engine 10 are a first vehicle-mounted device and a second vehicle-mounted device in a vehicle, respectively.

The alternating current output is subjected to full-wave rectification by a three-phase full-wave rectifier circuit 9 and is supplied to a battery 2 via an output terminal B of the power generator device 1. At the same time, the output of the three-phase full-wave rectifier circuit 9 is supplied from the output terminal B to an electric load 3 such as a lamp via a load switch 4.

An electronic control unit (ECU) 5 transmits a target output voltage of the power generator device 1, a control value (duty) of the field current of the field winding 8 and the like which are calculated by a power generator control signal output section 54 in the known manner, to a built-in voltage regulator 6 via a communication terminal C. The regulator 6 controls the field current in accordance therewith.

Figure 2:
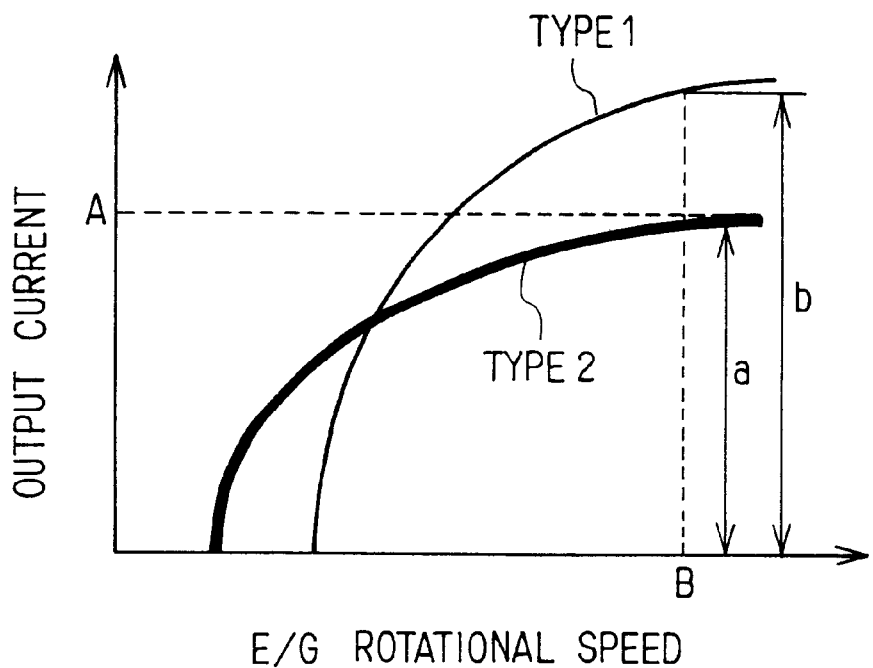
FIG. 2 is a characteristic diagram showing a rotation speed—output current characteristic of vehicular power generators.

As shown in FIG. 2, the characteristics between the output current and the rotational speed of the power generator device 1 differ from generator to generator (Type 1 and Type 2). The output of a power generator (Type 1) is large at a high rotation region, and the output of a power generator (Type 2) is large at a low rotation region. In the figure, if the output current is required to be restricted to be equal to or less than a value A at rotational speed B, the power generator (Type 2) is allowed to output its maximum power by 100% but the output of the power generator (Type 1) needs to be restricted to be equal to or less than a/b×100%.

Hence, the electronic control unit 5 transmits a restricting value of current to the regulator 6 through a communication line 100 so that the regulator 6 carries out control operation based on received information. If information with regard to the output current characteristic of the power generator is transmitted from the regulator 6 to the electronic control unit 5 in advance, the electronic control unit 5 responsively changes control constants at inside thereof based on the received information. Thus, the electronic control unit 5 can transmit the current restricting value to the regulator 6 in accordance with the output current characteristic of the power generator device 1. That is, by transmitting the information with regard to the output current characteristic of the power generator device 1, the power generator device 1 having a different output characteristic can be controlled by a single electronic control unit 5.

The electronic control unit 5 includes a control mode control section 50 and the regulator 6 includes a power generator identification signal transmitting section 60. The power generator identification signal transmitting section 60 transmits an identification signal indicating a type of the power generator device 1 via the communication line 100 to the control mode control section 50.

The power generator identification signal transmitting section 60 comprises a microcomputer including a non-volatile electrically rewritable memory (EEPROM). The microcomputer may inlcude a non-rewritable memory (PROM or ROM). The memory of the power generator identification signal transmitting section 60 stores generator type identification information supplied from a write terminal (not illustrated) of the regulator 6. Although it is preferable to write the information before mounting the regulator 6 in the power generator device 1, the information can be written after mounting. Generator type identification information may be written in a printed circuit board by changing a printed wiring pattern in place of the memory. Transmission of generator type identification information to the electronic control unit 5 may be carried out by time sharing along with other communication, can be carried out by the same line by using various multiplexing communication technologies, or may be carried out by using a plurality of serial lines.

The control mode control section 50 includes a non-volatile electrically rewritable memory (EEPROM) included in the electronic control unit 5 constructed with the microcomputer as a control mode storing section 53. The electronic control unit 5 constructed with the microcomputer periodically executes predetermined programs. The programs include a control mode selecting routine (control mode selecting section 52).

According to the control mode selecting routine, first, generator type identification information transmitted from the regulator 6 via the communication line 100 is read by a power generator identifying section 51. Next, the control mode indicating the read type identification information is selected from the control mode storing section 53 and control information determined based on the selected control mode is transmitted to the regulator 6. The control mode storing section 53 may naturally be constructed with ROM or PROM in place of the EEPROM. The electronic control unit 5 also includes an engine control signal output section 55, which outputs engine control signals in the known manner.

[Second Embodiment]

Figure 3:
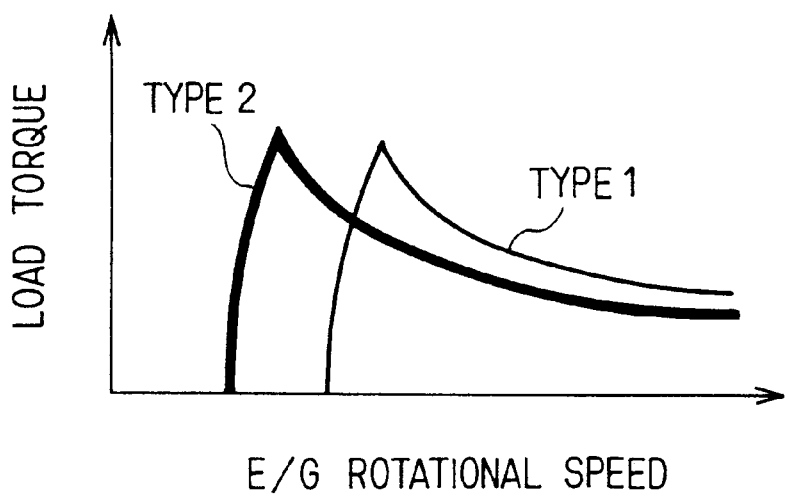
FIG. 3 is a characteristic diagram showing a rotational speed—load torque characteristic of vehicular power generators.

In a second embodiment, the electronic control unit 5 is designed to control the power generator device 1 based on the load torque—rotational speed characteristic of the power generator device 1 shown in FIG. 3. In FIG. 3, different load torque characteristics of two power generators are shown. The regulator 6 transmits power generation duty to the electronic control unit 5 and the electronic control unit 5 calculates torque of the power generator device 1 by the engine control signal outputting section 54 based on the received power generation duty to thereby carry out an engine feedback control. Further, the power generation duty signifies on-off switching duty of a switching device (not illustrated) for switching the field current of the field winding 8.

The torque characteristic of the power generator device 1 differs by a type of the power generator device 1. Accordingly, if information with regard to the torque characteristic of the power generator device 1 is transmitted from the regulator 6 to the electronic control unit 5 in advance, the electronic control unit 5 changes control constants at inside thereof based on the received information. Thus, the electronic control unit 5 can calculate power generator load torque in accordance with the actual torque characteristic of the power generator device 1. That is, by transmitting the information with regard to the torque characteristic of the power generator from the regulator 6 to the electronic control unit 5, even a single electronic control unit 5 can deal with a plurality of types of the power generators 1.

[Third Embodiment]

In a third embodiment, the power generator identification signal transmitting section 60 shown in FIG. 1 is omitted.

Similar to the first embodiment, the control mode control section 50 is provided with the non-volatile electrically rewritable memory (EEPROM) in the microcomputer as the control mode storing section 53. Further, the control mode control section 50 is provided with the non-volatile electrically rewritable memory (EEPROM) as the selected information storing section.

The electronic control unit 5 constructed with the microcomputer periodically executes predetermined programs and executes the control mode selecting routine (control mode selecting section 52) in the programs.

According to the control mode selecting routine, first, the number of a control mode to be selected which is previously stored in the EEPROM is read as the selected information storing section. Then, based on the read number of the control mode, a plurality of control modes stored in the EEPROM (control mode storing section 53). The control information determined based on the read control mode is successively transmitted to the regulator 6.

The number of the control mode to be selected may be written in the selected information storing section by connecting an external ROM writer to an input port of the electronic control unit 5, or may simply be written by using an input apparatus provided to the electronic control unit 5.

According to the third embodiment, the control mode selecting information that which one of the plurality of control modes previously stored in the electronic control unit 5 is to be selected, can be written in the electronic control unit 5. Accordingly, the selected information may be written from outside of the electronic control unit 5 to the electronic control unit 5. As a result, it is not necessary to transmit information for specifying the power generator device 1 from the regulator 6 and the construction of the regulator 5 can be simplified.

[Fourth Embodiment]

In a fourth embodiment, the power generator identification signal transmitting section 60 shown in FIG. 1 is omitted.

Similar to the first embodiment, the control mode control section 50 is provided with the non-volatile electrically rewritable memory (EEPROM) included in the electronic control unit 5 constructed with the microcomputer as the control mode storing section 53. The electronic control unit 5 periodically executes predetermined programs. According to the programs, control information determined based on a control mode stored in the EEPROM as the control mode storing section 53 is transmitted to the regulator 6. The selected information storing section can naturally be constructed with ROM or PROM in place of the EEPROM.

The control mode may be written to the non-volatile electrically rewritable memory (EEPROM) of the electronic control unit 5 by connecting an external ROM writer to an input port of the electronic control unit 5, or may simply be written thereto by using an input apparatus provided to the electronic control unit 5.

According to the fourth embodiment, control modes are rewritably stored in the rewritable non-volatile memory provided in the electronic control unit 5. Therefore, the stored control mode of the electronic control unit 5 may be rewritten in accordance with change of type of the power generator device 1. As a result, it is not necessary to transmit information specifying the power generator device 1 from the regulator 6 and the construction of the regulator 6 can be simplified.

[Fifth Embodiment]

Figure 4:
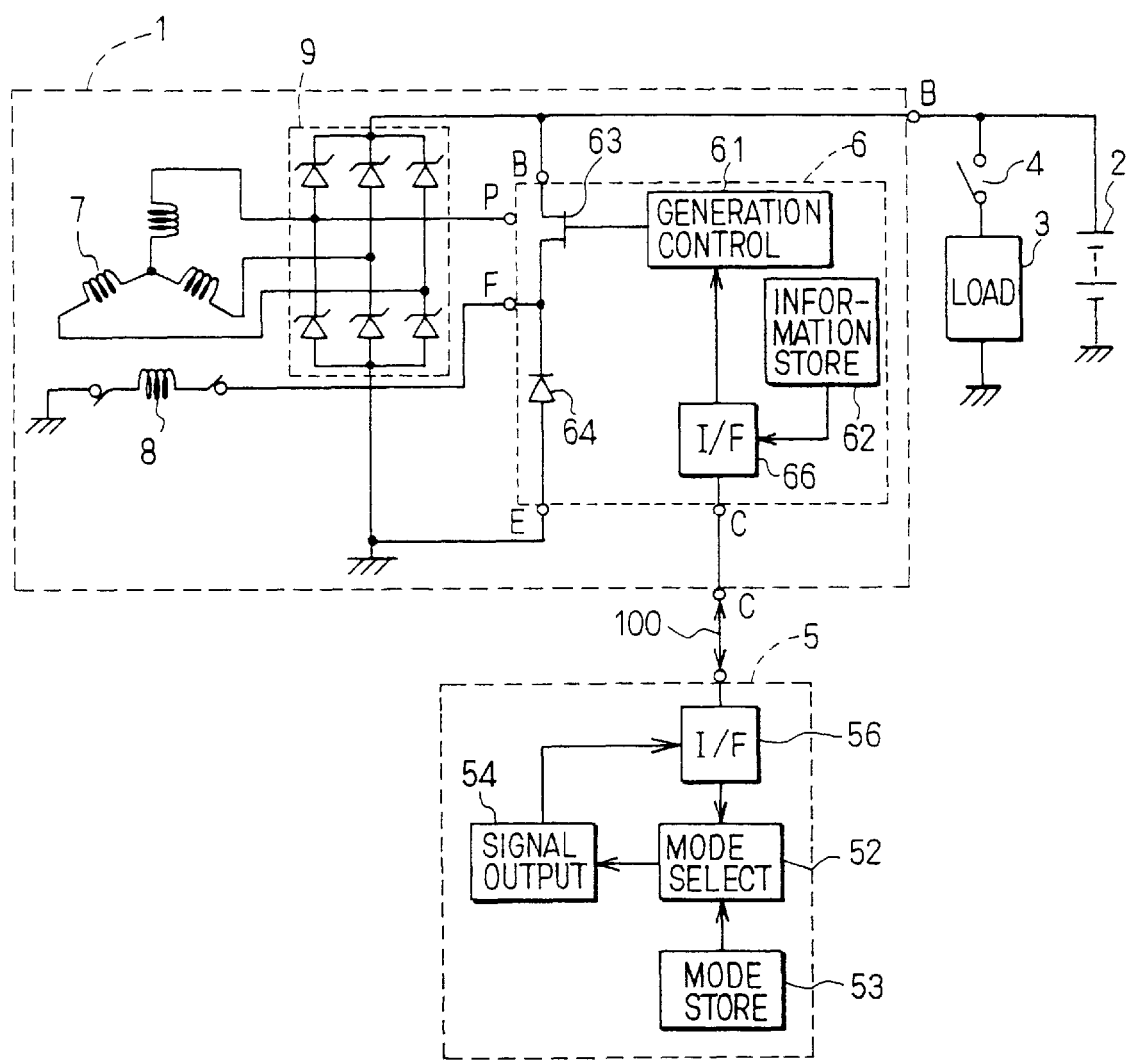
FIG. 4 is a block diagram of a vehicle-mounted power generator control system according to a fifth embodiment of the invention.

In a fifth embodiment, as shown in FIG. 4, the electronic control unit 5 and the voltage regulator 6 of the power generator 6 are constructed differently from the first to fourth embodiments shown in FIGS. 1 through 3.

The regulator 6 includes a switching transistor 63 for controlling the field current supplied to the field winding 8 and includes a flywheel diode 64 connected in parallel with the field winding 8. The regulator 6 includes a power generation control section 61 for controlling ON and OFF of the switching transistor 63 based on the control signal transmitted from the electronic control unit 5. This control signal is inputted via an interface circuit (I/F) section 66. For example, the power generation control section 61 controls to turn on and off the switching transistor 63 based on the control signal (target voltage Vref or a duty control value of the field current) inputted from the electronic control unit 5 so that a power generation state of the power generator device 1 follows the control signal received from the electronic control unit 5.

The electronic control unit 5 calculates the target voltage Vref or the duty control value of the field current of the power generator device 1 and transmits the same to the power generation control section 61 of the regulator 6 via the I/F section 66.

As shown in FIG. 2, the current output characteristics of power generators differs from type to type. Therefore, it is necessary that the electronic control unit 5 changes the control signal transmitted to the regulator 6 in accordance with a change of the output current characteristic of the power generator.

Therefore, the regulator 6 includes a generator type identification information storing section 62 for storing generator type identification information for specifying the output current characteristic (type) of the power generator device 1. This identification information is transmitted to the electronic control unit 5 via the I/F section 66 and the communication line 100 based on request from the electronic control unit 5, or periodically, or at each start of power supply.

The generator type identification information received from the regulator 6 is transmitted to a power generation control mode selecting section 52 of the electronic control unit 5 via an interface circuit (I/F) section 56.

The power generation control mode selecting section 52 selects the power generation control mode corresponding to the read generator type identification information from the power generation control mode storing section 53. The power generation control mode storing section 53 stores power generation control modes of all or predetermined types of power generators which can be provided in a vehicle mounted with the electronic control unit 5 in pair with the generator type identification information. The power generation control mode selecting section 52 selects the power generation control mode in pair with the generator type identification information corresponding to the read generator type identification information.

The selected power generation control mode is transmitted to the power generation control signal outputting section 54. The power generation control signal outputting section 54 calculates the power generation amount control value (target voltage Vref of power generator device 1 or duty control value of the field current or the like) based on the selected power generation control mode and transmits a result of the calculation to the regulator 6.

That is, according to the fifth embodiment, the generator type identification information is transmitted from the regulator 6 to the electronic control unit 5 of the vehicle as information with regard to the output current characteristic of the power generator device 1, based on the received generator type identification information. The electronic control unit 5 can change control constants and transmit the power generation amount control signal optimum for the output current characteristic of the power generator device 1 to the regulator 6.

Thereby, a single electronic control unit 5 mounted in a vehicle can optimally control many types of power generators having various output current characteristics different from each other.

In this embodiment also, the generator type identification information storing section 62 is constructed by a microcomputer including a non-volatile electrically rewritable memory (EEPROM). Further, the generator type identification information storing section 62 may be constructed with a circuit or a memory capable of transmitting type identification information of the power generator device 1 to the electronic control unit 5 via the communication line 100. A non-rewritable memory (PROM or ROM) may be used in place of the non-volatile electrically rewritable memory (EEPROM). Other than these, when the number of types of power generators which can be mounted in one type of vehicle is small, the generator type identification information may be stored by cutting 4 pieces of lead terminals coming out from a resin package of IC, or penetrating or cutting a conductive pattern of a printed circuit board by a punching press.

The generator type identification information may be written in the EEPROM of the generator type identification information storing section 62 from a write terminal, not illustrated, of the regulator 6. Further, although it is preferable to write the generator type identification information before mounting the regulator 6 on the power generator device 1, the generator type identification information can be written after the mounting operation. In place of a memory, the generator type identification information may be written to a printed circuit board by changing a printed wiring pattern. The generator type identification information can be transmitted to the electronic control unit 5 by time sharing along with other communication.

In the fifth embodiment, a control can be carried out so that the regulator 6 monitors generated voltage VB, compares the generated voltage VB with the target voltage Vref transmitted from the electronic control unit 5 and controls the generated voltage VB to the target voltage Vref.

[Sixth Embodiment]

Figure 5:
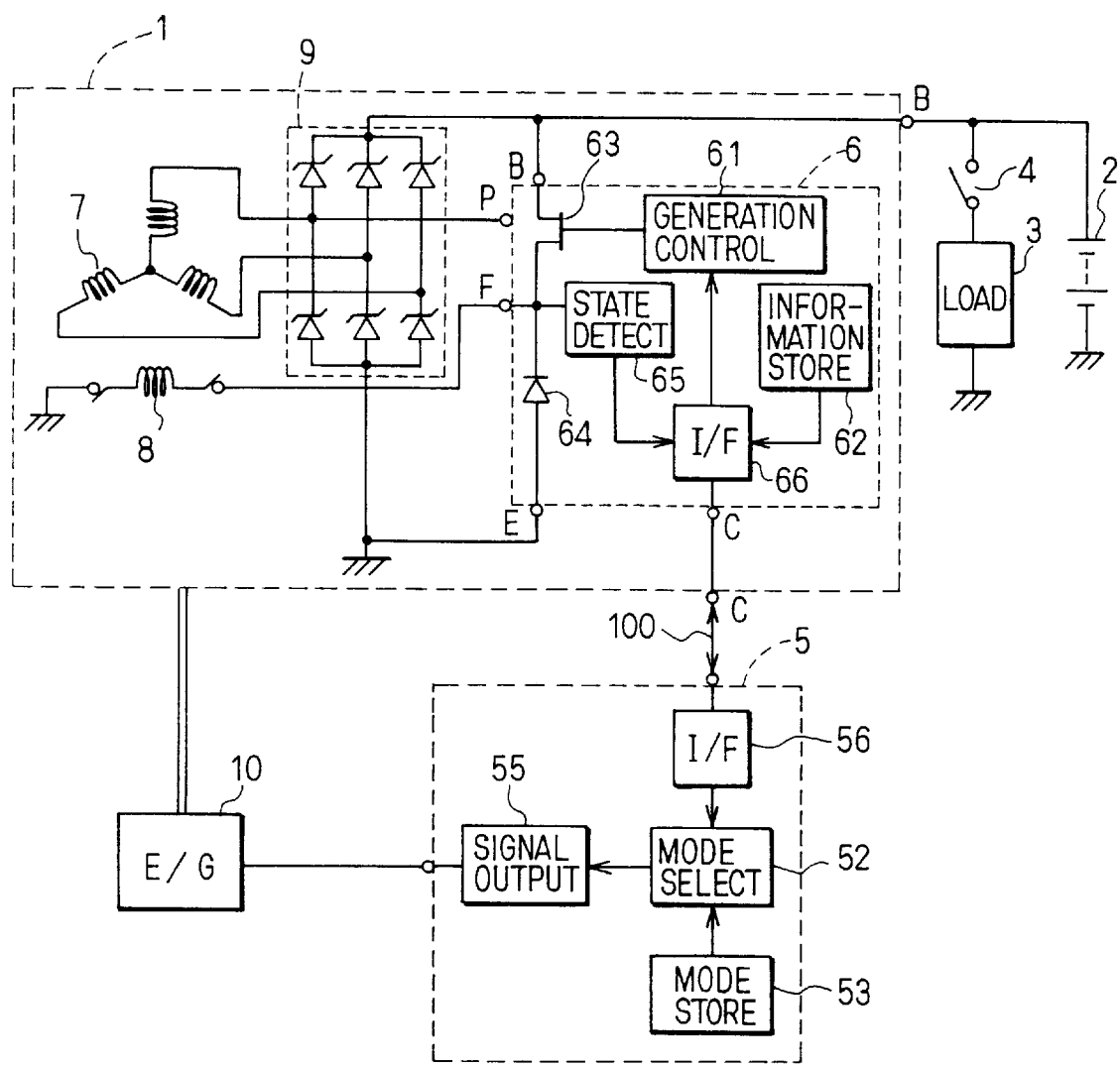
FIG. 5 is a block diagram of a vehicle-mounted power generator control system according to a sixth embodiment of the invention.

In a sixth embodiment, as shown in FIG. 5, the regulator 6 includes a power generation state detecting section 65. The power generation state detecting section 65 detects ON-duty of the switching device 63 for switching the field current of the field winding 8 and transmits ON-duty to the electronic control unit 5 via the communication line 100. The electronic control unit 5 is designed to control the engine (E/G), which drives the power generator device 1.

The electronic control unit 5 calculates load torque of the power generator device 1 based on the signal and carries out engine feedback control. That is, the field current can be calculated from ON-duty of the switching device 63 and the load torque of the power generator can be predicted from the rotational speed of the alternator in proportion to the engine rotational speed and the field current. Therefore, the electronic control unit 5 can calculate the load torque. The torque—rotational speed characteristics of two types of alternators different from each other are shown in FIG. 3.

Therefore, if information with regard to the torque characteristic of the power generator device 1 (ON-duty in this embodiment) is transmitted from the regulator 6 to the electronic control unit 5 in advance, the electronic control unit 5 can transmit an engine feedback control signal in accordance with the torque characteristic of the power generator device 1 to the engine 10 by switching control constants based on the information. That is, the power generator device 1 controls the engine 10 to generate engine torque in accordance with the load torque of the power generator device 1 calculated based on received ON-duty.

In order to execute the control, the regulator 6 stores the generator type identification information for specifying the torque characteristic (type) of the power generator at the generator type identification information storing section 62. The generator type identification information is transmitted to the electronic control unit 5 via the I/F section 66 and the communication line 100.

The electronic control unit 5 reads the signal at the I/F section 56 and transmits the signal to the control mode selecting section 52. The control mode selecting section 52 selects an engine feedback control mode (constant or map data necessary for calculation which differs for respective power generators in power generator torque calculating routine) corresponding to the inputted generator type identification information from the control mode storing section 53. It outputs the engine feedback control mode to an engine control signal outputting section 55. Therefore, the control mode storing section 53 stores the necessary number of pairs of the generator type identification information and the engine feedback control modes.

The engine control signal outputting section 55 calculates a control signal of the engine 10 based on the selected engine feedback control mode and controls the engine 10 based on the control signal.

That is, the generator type identification information as information with regard to the characteristic of the power generator device 1 is transmitted from the regulator 6 to the electronic control unit 5. The electronic control unit 5 changes the control constants based on the generator type identification information. Based on the data (ON-duty) with regard to the power generation state read from the power generator device 1, the engine characteristic of which is influenced by the type of the power generator device 1 is also controlled in correspondence with the characteristic of the power generator device 1.

The power generation state detecting section 65 can be constructed with a circuit for converting input voltage into a pulse signal by a comparator or a binarizing circuit. Although the pulse signal outputted by the power generation state detecting section 65 can directly be outputted to the electronic control unit 5, the pulse signal may be transmitted after being converted into a digital signal.

The generator type identification information outputted by the generator type identification information storing section 62 and the pulse signal outputted by the power generation state detecting section 65 can be multiplexed by a single communication line and outputted, or can be outputted by separate communication lines. For example, the pulse signal (including 0% level and 100% level) indicating the ON-duty may be directly transmitted, until elapse of a predetermined time period from when an ignition switch is turned on, transmission from the power generation state detecting section 65 is cut off and the time period is made to constitute an generator identification transmission time period and a mode of transmitting the generator type identification information may be interrupted.

Although the power generator control and the engine control are separately carried out in the above embodiments, both of the controls can be carried out integratedly. In this case, the generator type identification information can be shared by the two controls.

What is claimed is:

1. A vehicle-mounted control system, comprising:
   a vehicle-mounted device controllable in response to a control signal applied thereto;
   an electronic control unit for controlling the vehicle-mounted device by outputting the control signal; and
   communicating means connecting the vehicle-mounted device and the electronic control unit for transmitting the control signal from the electronic control unit to the vehicle-mounted device, wherein the electronic control unit is constructed to change automatically the control signal in correspondence with a change in a type of the vehicle-mounted device, wherein the electronic control unit includes:
   a control mode storing section for storing a plurality of control modes different from each other based on characteristics of types of the vehicle-mounted device; and
   a control mode selecting section for selecting one of the plurality of control modes, wherein the electronic control unit outputs the control signal to control the vehicle-mounted device based on the control mode selected by the control mode selecting section and the vehicle-mounted device stores therein identification information specifying the type thereof and transmits the identification information to the electronic control unit, and the control mode selecting section selects the control mode based on the identification information transmitted from the vehicle-mounted device.

2. The vehicle-mounted control system as in claim 1, wherein:
   the control mode selecting section further includes a selected information storing section for rewritably storing control mode selecting information inputted from an outside, and
   the control mode selecting section selects the control mode based on stored information of the selected information storing section.

3. The vehicle-mounted control system as in claim 1, wherein:
   the control mode storing section for rewritably stores the control modes.

4. The vehicle-mounted control system as in claim 1, wherein:
   the vehicle-mounted device includes a voltage regulator fixed to a power generator for generating an electric power when rotated by an engine for regulating an output voltage of the power generator.

5. The vehicle-mounted control system as in claim 4, wherein:

the electronic control unit is constructed to control the engine based on the control mode selected by the control mode selecting section.

6. A vehicle-mounted control system, comprising:

a vehicle-mounted device controllable in response to a control signal applied thereto;

an electronic control unit for controlling the vehicle-mounted device by outputting the control signal; and communicating means connecting the vehicle-mounted device and the electronic control unit for transmitting the control signal from the electronic control unit to the vehicle-mounted device, wherein the electronic control unit is constructed to change automatically the control signal in correspondence with a change in a type of the vehicle-mounted device and the vehicle-mounted device includes a voltage regulator fixed to a power generator, which is rotated by an engine and generates an electric power, for regulating an output voltage of the power generator, and the voltage regulator stores therein identification information specifying the type of the power generator and transmits the identification information to the electronic control unit, wherein the electronic control unit determines the control signal in correspondence with the identification information.

7. The vehicle-mounted control system as in claim 6, wherein:

the voltage regulator includes an identification information storing section for rewritably storing identification information specifying the type of the power generator.

8. The vehicle-mounted control system as in claim 6, wherein:

the control signal transmitted from the electronic control unit defines a power generation amount of the power generator.

9. The vehicle-mounted control system as in claim 6, wherein:

the voltage regulator includes a power generator state detecting section for detecting and transmitting a power generator state information indicating a state of the power generator to the electronic control unit.

* * * * *